United States Patent Office 3,317,564
Patented May 2, 1967

3,317,564
PROCESS FOR PRODUCING CHROMANS
Rudolf Rüegg, Bottmingen, and Peter Schudel, Munchenstein, Switzerland, assignors to Hoffmann-La Roche Inc., Nutley, N.J., a corporation of New Jersey
No Drawing. Filed June 26, 1964, Ser. No. 378,447
Claims priority, application Switzerland, July 4, 1963, 8,310/63
5 Claims. (Cl. 260—345.5)

This invention relates, in general, to a novel process and to a class of compounds produced by such process. More particularly, the invention relates to a new and improved process for the production of chroman compounds.

The compounds which are produced in the practice of the present invention have the formula

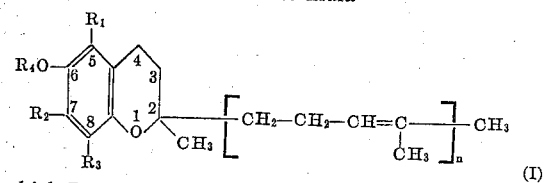

(I)

in which $R_1$ represents hydrogen, alkyl or alkoxy; $R_2$ represents hydrogen, alkyl or alkoxy; $R_3$ represents hydrogen, alkyl or alkoxy; $R_4$ represents hydrogen or alkyl; and $n$ represents an integer of 1 to 9, inclusive; with the proviso that at least one of the symbols $R_1$, $R_2$ or $R_3$ represents a member other than hydrogen.

The alkyl groups which, in Formula I, are represented by the symbols $R_1$, $R_2$, $R_3$ and $R_4$ are, preferably, lower alkyl groups as, for example, methyl, ethyl, propyl, etc. radicals. The alkoxy groups which, in Formula I, are represented by the symbols $R_1$, $R_2$ and $R_3$ are preferably lower alkoxy groups, as for example, methoxy, ethoxy, propoxy, butoxy, etc. radicals. At least one of the members represented by the symbols $R_1$, $R_2$ and $R_3$ will be a member other than hydrogen. Stated differently, at least one of the members represented by the symbols $R_1$, $R_2$ and $R_3$ will be an alkyl or alkoxy group. Furthermore, in the preferred practice of the invention, the presently described process is utilized as a means of producing those compounds of Formula I in which the symbol $n$ represents the integer 3, 8 or 9.

The process of this invention comprises reducing a chromene compound having the formula

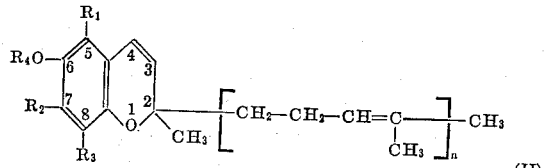

(II)

in which the symbols $R_1$, $R_2$, $R_3$, $R_4$ and $n$ have the same meaning as in Formula I or an ester of such chromene compound, such reduction being effected by reacting said chromene compound, or an ester thereof, in alcoholic solution, with an alkali metal.

As the starting materials in the practice of this invention, there can be used a chromene of the tocopherol or ubiquinone series which has the structure depicted in Formula II. These starting materials can be obtained, for example, by heating a quinone having the formula

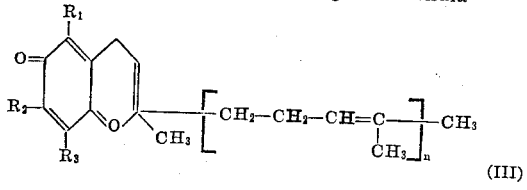

(III)

in which the symbols $R_1$, $R_2$, $R_3$ and $n$ have the same meaning as in Formula I with pyridine.

The reduction of the Formula II compound to the desired Formula I compounds is effected, conveniently, by introducing an alkali metal, for example, sodium or potassium, into an alcoholic solution of the starting Formula II compound or into an alcoholic solution of an ester of the Formula II compound. The alkali metal which is used in the preferred practice of this invention, is sodium, although some other alkali metal, for example, potassium, can be employed, if desired. As the alcohol solvent, one can use monohydric aliphatic alcohol in which the Formula II starting material is soluble. Preferably, the Formula II compound is reduced while dissolved in ethyl alcohol. The esters which are suitable for use as the starting material in the present invention are esters of the Formula II compound either with a lower alkane carboxylic acid or with an aromatic carboxylic acid. Especially well suited for use are esters of the Formula II compound with acetic acid and benzoic acid, that is, the acetate and benzoate esters thereof. Included among the chromene compounds which can be reduced by the process of this invention are, for example, 2,5,7,8-tetramethyl-2-(4,8,12-trimethyl-3,7,11-tridecatrien-1-yl)-6-hydroxy-1,2 - chromene or an ester thereof; 2,5,8-trimethyl-2-(4,8,12-trimethyl-3,7,11-tridecatrien-1-yl)-6-hydroxy-1,2-chromene or an ester thereof; 2,5-dimethyl-7,8-dimethoxy-2-(4,8,12-trimethyl-3,7,11-tridecatrien-1-yl)-6-hydroxy-1,2 - chromene or an ester thereof; 2,5-dimethyl-7,8-dimethoxy-2-(4,8, 12,16,20,24,28,32,36 - nonamethyl - 3,7,11,15,19,23,27, 31,35-heptatriacontanonaen-1-yl)-6-hydroxy - 1,2 - chromene or an ester thereof; 2,5-dimethyl-7,8-dimethoxy-2- (4,8,12,16,20,24,28,32-octamethyl - 3,7,11,15,19,23,27,31- tritriacontaoctaen-1-yl)-6-hydroxy-1,2 - chromene or an ester thereof; etc.

In carrying out the aforementioned reduction, the Formula II compound is heated, while dissolved in an alcohol solvent, in the presence of an alkali metal. The temperature at which the reaction mixture is heated is variable. However, the reaction can be carried out, most conveniently, at the reflux temeprature of the reaction mixture. The compound which is produced by the present process can be isolated from the reaction mixture, and purified, if desired, by conventional means.

The compounds which are produced by the process described herein have a high degree of vitamin E activity. These compounds are useful as antioxidants for foodstuffs, feedstuffs, vitamin preparations and the like.

For a fuller understanding of the nature and objects of this invention, reference may be had to the following examples which are given merely as further illustrations of the invention and are not to be construed in a limiting sense.

Example 1

In this example, 5.3 grams of 2,5,7,8-tetramethyl-2-(4, 8,12-trimethyl-3,7,11-tridecatrien-(1) - yl) - 6 - hydroxy-1,2-chromene was dissolved in 150 ml. of boiling absolute ethyl alcohol. Thereafter, 53 grams of sodium chips were added to the boiling solution and heating of the resulting solution was continued for a period of about three hours. During the heating step, colloidal sodium ethylate was observed to separate out of the solution. The compound was brought again into solution by the addition of absolute ethyl alcohol to the reaction mixture. When the heating step was completed, the sodium, at that time, having been completely dissolved, the reaction mixture was cooled and an aqueous saturated sodium chloride solution was added thereto. Subsequently, the mixture was extracted three times using ethyl ether. The lipophilic phase was separated and neutralized by shaking with water, following which it was dried over sodium sulphate. The solvent was then removed to yield a brown-colored oil. This oil was purified by absorption on 600 grams of neutral aluminum oxide (activity grade III). The desired 2,5,7,8-tetramethyl-2-(4,8,12-trimethyl-3,7,11-tridecatrien-1-yl)-6-hydroxy chroman was isolated by elution with a mixture of petroleum ether and ethyl ether (40:1). This product showed bands in the nuclear resonance spectrum at 4.87τ (3 olefinic hydrogen atoms), 8.34τ and 8.42τ (4 olefinic methyl groups) which are characteristic of the unsaturated side chain U.V. $\lambda_{max.}$: 289-290 mμ ($E_{1cm.}^{1\%}$=77.0 in 96% alcohol)

*Example 2*

In this example, 2.35 grams of 2,5,8-trimethyl-2-(4,8,12-trimethyl-3,7,11-tridecatrien-1-yl) - 6 - hydroxy - 1,2-chromene was dissolved in 200 ml. of absolute ethyl alcohol. This solution was heated to its boiling point and 23.5 grams of sodium chips were added thereto. The reaction mixture was then heated at reflux until the sodium therein was completely dissolved. Thereafter, the reaction mixture was cooled and an aqueous saturated sodium chloride solution was added thereto. The reaction mixture was then exhaustively extracted with ether. The lipophilic phase was then separated, neutralized by shaking with water, dried over sodium sulfate and evaporated to a viscous brown-colored oil. This oil was purified by simple distillation in a high vacuum. The 2,5,8-trimethyl-2-(4,8,12-trimethyl-3,7,11-tridecatrien-1 - yl) - 6 - hydroxy chroman, which was thus obtained, had bands in the nuclear resonance spectrum at 4.9τ (3-olefinic hydrogen atoms), 8.35τ and 8.42τ (4 olefinic methyl groups) which are characteristic of the saturated side chain U.V. $\lambda_{max.}$: 295mμ ($E_{1cm.}^{1\%}$=85.0 in 96% alcohol)

*Example 3*

In this example, 500 mg. of 2,5-dimethyl-7,8-dimethoxy-2-(4,8,12,16,20,24,28,32 - octamethyl - 3,7,11,15,19,23,27,31-tritriacontaoctaen-1-yl)-6-chrom-1,2-enyl acetate was dissolved in 3 ml. of isopropyl ether and 25 ml. of absolute ethyl alcohol. This solution was heated to its boiling temperature and, at that temperature, 5 grams of sodium chips were added thereto. The reaction mixture was then heated at reflux, with the exclusion of moisture, for a period of about three hours. The colloidal sodium ethylate which separated out during this heating step was brought again into the solution by the addition of absolute ethyl alcohol to the reaction mixture. At the end of the three hour heating period, all of the sodium present in the reaction mixture then being in solution, the reaction mixture was cooled and extracted with petroleum ether of medium boiling point. The lipophilic phase was neutralized by shaking with water, dried over sodium sulphate and concentrated, under reduced pressure, at a temperature of about 50° C. There was obtained, in the form of an oil, 2,5-dimethyl-7,8 - dimethoxy - 2 - (4,8,12,16,20,24,28,32 - octamethyl-3,7,11,15,19,23,27,31 - tritriacontaoctaen - 1 - yl)-6-hydroxy chroman. This compound had bands in the nuclear resonance spectrum at 4.88τ (olefinic hydrogen atoms), 6.08τ 6.13τ (2 OCH₃ groups) and 7.45τ benzoylic methyl groups) which are characteristic of the unsaturated side chain.

What is claimed is:

1. A process for producing a chroman compound of the formula

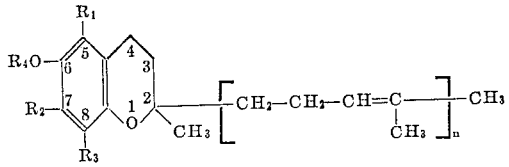

in which $R_1$ is a member selected from the group consisting of hydrogen, alkyl and alkoxy; $R_2$ is a member selected from the group consisting of hydrogen, alkyl and alkoxy; $R_3$ is a member selected from the group consisting of hydrogen, alkyl and alkoxy; $R_4$ is a member selected from the group consisting of hydrogen and alkyl; and $n$ is an integer of from 1 to 9, inclusive, with the proviso that at least one of the symbols $R_1$, $R_2$ and $R_3$ represents a member other than hydrogen which comprises reducing a member selected from the group consisting of a chromene compound of the formula

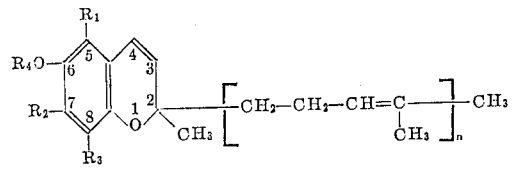

in which symbols $R_1$, $R_2$, $R_3$, $R_4$ and $n$ have the same significance as stated above and an ester of said chromene compound, said reduction being effected by heating said chromene compound, while dissolved in an alcohol, with an alkali metal.

2. The process of claim 1 wherein the chromene compound is heated with sodium while dissolved in ethyl alcohol.

3. The process of claim 2 wherein the starting material is 2,5,7,8-tetramethyl - 2 - (4,8,12 - trimethyl-3,7,11-tridecatrien-1-yl)-6-hydroxy-1,2-chromene.

4. The process of claim 2 wherein the starting material is 2,5,8 - trimethyl - 2 - (4,8,12 - trimethyl - 3,7,11-tridecatrien-1-yl)-6-hydroxy-1,2-chromene.

5. The process of claim 2 wherein the starting material is 2,5 - dimethyl - 7,8 - dimethoxy - 2 - (4,8,12,16,20,24,28,32-octamethyl - 3,7,11,15,19,23,27,31 - tritriacontaoctaen-1-yl)-6-chrom-1,2-enyl acetate.

References Cited by the Examiner

UNITED STATES PATENTS

| 3,064,012 | 11/1962 | Folkers et al. | 260—345.5 |
| 3,153,040 | 10/1964 | Robeson et al. | 260—345.5 X |
| 3,187,011 | 6/1965 | Sevigne | 260—345.5 |

WALTER A. MODANCE, *Primary Examiner.*

JOHN M. FORD, *Assistant Examiner.*